May 19, 1931.     R. THAYER     1,806,316
AIRCRAFT
Original Filed Nov. 14, 1924    2 Sheets-Sheet 2
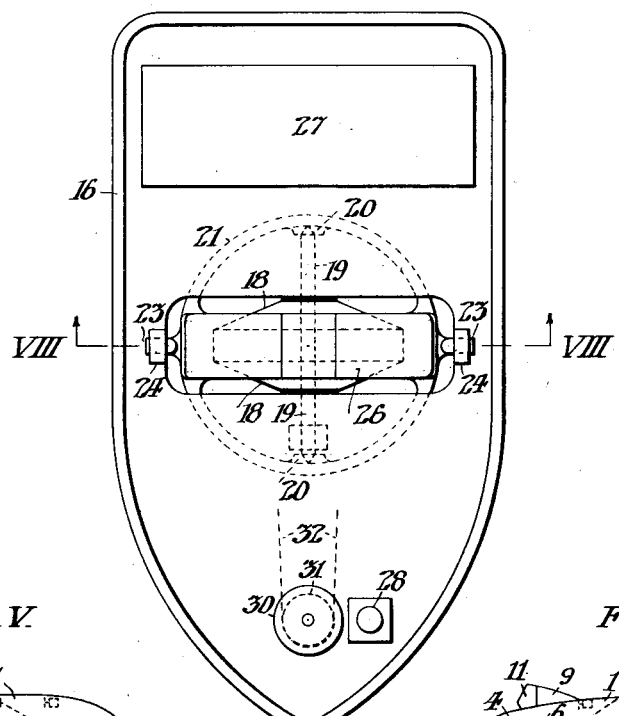
FIG. VII.
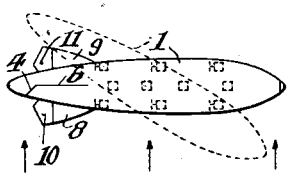
FIG. V.
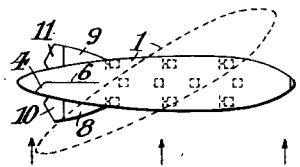
FIG. VI.
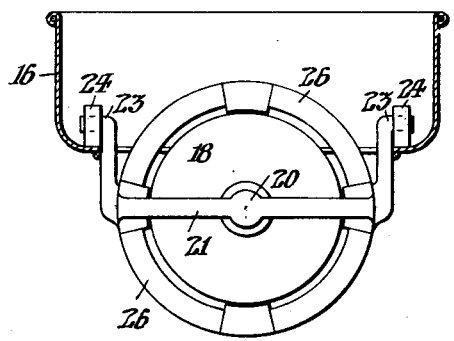
FIG. VIII.
INVENTOR:
RUSSELL THAYER, Patented May 19, 1931

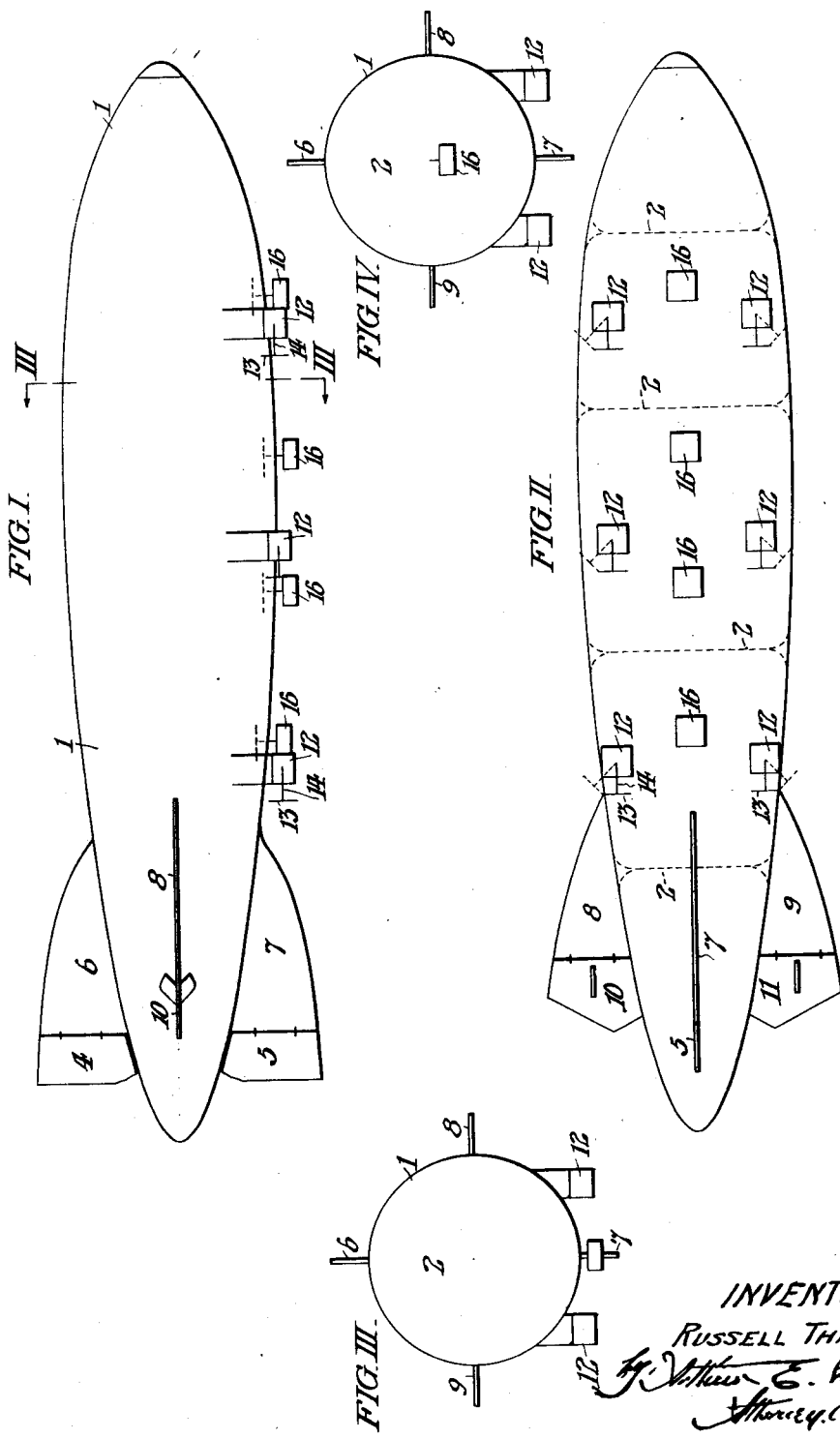

1,806,316

UNITED STATES PATENT OFFICE

RUSSELL THAYER, OF PHILADELPHIA, PENNSYLVANIA

AIRCRAFT

Refile of abandoned application Serial No. 749,898, filed November 14, 1924. This application filed February 11, 1929. Serial No. 339,190.

My present invention is an improvement upon the dirigible balloon structures contemplated in Letters Patent of the United States No. 887,443 granted to me May 12, 1908, and includes the correlation with certain of the essential elements of that patented structure of rotary propellers arranged to counteract, modify or supplement the wind pressure upon the craft, in accordance with the principles disclosed in said Letters Patent as applicable to a dirigible balloon having no means whatever to propel it except such wind pressure.

In navigating a marine vessel, the effects of the wind pressure and of any other propelling means, are controllable by utilizing the reactive effect of the water upon the vessel, whereas, in ordinary balloons, there is no equivalent for the reactive effect of the water and, consequently, such balloons must go with the wind unless provided with more powerful propelling means. Therefore, it was the object of my patented invention aforesaid to provide a balloon with means whereby a reactive force may be created and controlled local to the balloon, at the will of the operator, so as to be similar in effect to the reactive force of the water upon a marine vessel in that by properly utilizing it, the balloon may be progressed, solely by wind pressure, in directions oblique with respect to the direction of the wind and, accordingly, I utilized the reactive gyroscopic force manifested upon any attempt to change the direction of axis of rotation of a rotary body, in combination with the wind pressure upon a balloon floating in the atmosphere and carrying said body; so that movement of the balloon may be variably determined and controlled by correlation of the force developed by the gyroscope and the force of the air current. In other words, my patented invention aforesaid provides means whereby wind pressure tending to diverge an aircraft from a predetermined direction of traverse, may be variably opposed by the gyroscopic effect of a rotary body carried by such craft, under control of the operator, so that such wind pressure may be utilized to progress the craft in directions oblique to the direction of the wind pressure, as in ordinary marine navigation. Of course, such means are incapable of progressing the craft in direct opposition to the wind drift.

The gyroscopic reactive effect above contemplated is due to the fact that a rotary body tends to maintain constant its plane of rotation and consequent direction of its axis of rotation; such effect being increased or diminished in correspondence with the rate of rotation of the body. However, to render such reactive effect available, as herein contemplated, it is necessary to so mount the rotary body that its axis of rotation is free to oscillate, for, when a body rotating upon a principal axis is subjected to any force tending to produce other rotation not parallel to the normal rotation of such body, the resultant effect is such displacement of the axis of the original rotation, with respect to its support, as tends to bring the two rotations into parallelism and, consequently, such displacement is at right angles to the direction of the disturbing force.

In the simple form of my invention shown in said Letters Patent, there were but three factors affecting the direction of traverse of the craft, viz., first, wind pressure upon the craft. Second, pressure upon a rudder variable in its relation to the craft, and, third, a gyroscopic body or bodies carried by the craft. Of course, traverse of such a craft in any direction except altitudinally is dependent upon wind pressure and, consequently, traverse of such a craft toward its destination practically ceases when it is becalmed.

Therefore, the object and effect of my present invention is to provide means to correlate with the three factors aforesaid a fourth factor, to wit, a rotary propeller or propellers whereby such craft may be caused to progress in a direction contrary to the air pressure and consequent drift. Moreover, it is to be understood that the inclusion of the additional propelling factor permits such craft to be progressed when the wind pressure and drift are minimized to such a degree that, otherwise, the craft would remain stationary.

I am aware that gyroscopes have been employed in various arts, prior to my patented invention aforesaid, to balance or maintain the level or equilibrium of structures connected therewith, and particularly that it has been proposed to provide a marine vessel with gyroscopic wheels. Therefore, it is to be particularly noted that such gyroscopic elements in marine vessels were arranged to maintain the horizontal planes of the vessel substantially stable, without opposing changes in the direction of traverse of the vessel. That is to say, such devices of the prior art have been employed for purposes radically different from that herein contemplated and have been so constructed and arranged as to be incapable of the effects which are characteristic of my invention.

My invention includes the various novel features of construction and arrangement hereinafter more definitely specified.

In said drawings: Fig. I is a side elevation of a dirigible, lighter-than-air, aircraft, conveniently embodying my invention.

Fig. II is an inverted plan view of said aircraft shown in Fig. I.

Fig. III is a transverse sectional view of said aircraft, taken on the line III, III in Fig. I.

Fig. IV is a transverse sectional view, similar to Fig. III, but showing a modified location of the gyroscopes.

Figs. V and VI are plan views of said aircraft, on a smaller scale, illustrating manipulation thereof to effect its progression in directions transverse to the air drift.

Fig. VII is a plan view of one of the pendent cars indicated in the preceding figures, containing a convenient form of my gyroscopic device.

Fig. VIII is a transverse sectional view of the structure shown in Fig. VII, taken on the line VIII, VIII in Fig. VII.

In said figures; the aircraft shell 1 is preferably formed of sheet metal such as duralumin, internally braced to rigidly maintain its fusiform configuration shown. Said shell forms a container for a plurality of envelops 2 adapted to hold levitating gas, preferably helium.

Said shell is provided with rudders 4 and 5 respectively above and below it and pivotally connected with respective vertical plane fins 6 and 7 which are connected in rigid relation with said shell 1 so as to project diametrically from respectively opposite sides thereof. Said rudders are respectively provided with independently movable controlling means arranged to be operated from a single control station which may be in any one of the cars which are pendent from said shell. Said shell also has, rigidly connected therewith, horizontal plane fins 8 and 9 which extend in rigid relation therewith from diametrically opposite sides thereof, and carry respective pivoted rudders 10 and 11.

Said shell 1 carries a plurality of, conveniently six, power cars 12 which are suspended from the bottom thereof, conveniently in the relative position shown in Fig. II. Each of said power cars 12 is provided with a rotary propeller 13, the axis 14 of which may be angularly adjustable laterally in a substantially horizontal plane, as indicated by the dotted lines in Fig. II, and each of said cars also includes means to rotate the respective propeller 13; such means conveniently comprising respective internal combustion motors.

Said shell 1 also carries a plurality of, conveniently four, gyroscope cars 16. Altho I have found it convenient to indicate all of said cars 12 and 16 diagrammatically, as of square form, they are preferably pointed at their forward ends, as indicated in Fig. VII, and of stream line construction, like a boat hull.

Referring to Figs. VII and VIII; it is to be understood that each of said cars 16 carries a rotary body 18 whose mass may be in any desired proportion to the mass of the craft. Each of said rotary bodies 18 is rigidly connected with, and carried by, an axial shaft 19 which normally extends substantially horizontal and parallel with the longitudinal axis of said shell 1 and, consequently, parallel with the normal direction of traverse of the craft. Each such shaft 19 is mounted to rotate in bearings 20 of the gimbal frame 21 and the latter is provided with oppositely extending trunnions 23 having a common axis of oscillation extending transversely above the center of gravity of said rotary body 18 and said frame. As shown in Figs. VII and VIII, the arms of said gimbal frame 21 provided with said trunnions 23 extend thru an opening in the floor of the car 16, the extent of which opening in the direction of the length of the shaft 19 limits the oscillation of said shaft in a plane normal to the axis of said trunnions, which plane is maintained substantially perpendicular during the operation of the craft; so that each of the gyroscopic bodies is constructed and arranged for free, but limited, altitudinal oscillatory movement with respect to its car 16 and, consequently, with respect to the shell 1. Said trunnions 23 are journaled in bearings 24 and so constructed and arranged that the altitudinal oscillatory movement of each body 18 with respect to said shell 1 is limited, by the width of the opening, in the floor of the car 16 thru which said frame 21 depends, as shown in Figs. VII and VIII, altho the entire gyroscopic system, being suspended from said shell 1, is free to turn azimuthally therewith. Said bearings 24 are supported by the respective cars 16 and may be adjusted and secured in variable relation with the longitudinal axis of said shell 1 by any convenient means.

The rotation of each gyroscopic body 18 may be effected and controlled by any convenient means. However, in the form indicated in Fig. VII, said body comprises the armature of an electric motor having the field frame 26, carried by said gimbal frame 21, and said motor is energized by suitable connections with the source of power 27, controlled by the switch mechanism indicated at 28. It is to be understood that each of said bodies 18 may be rotated at variable speed, to produce and control its gyroscopic effect, so that said effect may be opposed to any force tending to turn the craft from a path coincident with its longitudinal axis and that, consequently, any wind pressure upon the craft so received as to tend to change the plane of rotation and direction of the axes of said bodies 18, may be opposed by the gyroscopic effect of said bodies so that such wind pressure may be utilized to effect the forward movement of the craft in a direction oblique with respect to the direction of the wind, if desired; the direction of propulsion being so variably determinable, at the will of the operator, by adjustment of the angular relation of said rudders with respect to the longitudinal axis of said shell 1, conveniently by the steering wheel 30 indicated in Fig. VII, which is operatively connected with the drum 31 from which flexible connectors 32 lead to said rudders.

Altho I have shown said cars 16 in Figs. I, II, and III as suspended below said shell 1; they may be suspended within the latter, as indicated in Fig. IV.

Under what is, perhaps, the most severe condition to be overcome, an aircraft such as above described is manipulated as follows: With the propellers, rudders and gyroscopes motionless, and with the craft drifting with the wind, in the direction indicated by the arrows in Fig. V, but with its axis at right angles thereto as indicated in full lines in said figure, if the rear port propellers are operated forward and the rear starboard propellers reversed, and simultaneously therewith the rudders are thrown to starboard, the craft will take the position indicated in dotted lines in Fig. V, altho still drifting in the direction indicated by the arrows, and twisting. However, if the gyroscopes are then put in operation to hold the axis of the craft in the direction indicated by said dotted lines in Fig. V, and all the propellers are operated forward; the combined action of the propellers, wind pressure and rudders and resistance of the gyroscopes will cause the craft to progress, transversely to the direction of the wind but in the general direction of the craft axis in said position indicated in dotted lines in Fig. I. Similarly, if with the aircraft drifting in the direction indicated by the arrows in Fig. VI, and with its axis at right angles to such drift, the rear starboard propellers are operated forward and the rear port propellers reversed, and simultaneously therewith, the rudder is thrown to port, the craft will take the position indicated by the dotted lines in Fig. VI altho still drifting with the wind and twisting. If then the gyroscopes are put in operation to hold the craft axis in the direction indicated by the dotted lines in Fig. VI, and all the propellers are operated forward; the combined action of the propellers, wind pressure and rudders and resistance of the gyroscopes will cause the craft to progress, transversely to the direction of the wind drift, but in the general direction indicated by the dotted outline of the craft in Fig. VI.

This application is a refile of my abandoned application Serial No. 749,898 filed November 14, 1924.

I do not desire to limit myself to the precise details of construction and arrangement herein described, as various modifications may be made therein without departing from the essential features of my invention, as defined in the appended claims.

I claim:

1. In an aircraft, the combination with a substantially rigid fusiform shell; of levitating means; a rotary gyroscopic body having its axis substantially parallel with the longitudinal axis of said shell; means supporting the axis of said gyroscopic body, permitting automatically free but limited altitudinal oscillatory movement thereof; a rotary propeller arranged to propel air parallel to the axis of said shell; and a rudder extending transversely to the axis of said shell beyond the radius of said propeller and angularly adjustable with respect to the axis of said shell; whereby, wind pressure tending to turn the aircraft from a predetermined direction of traverse, may be opposed by the gyroscopic effect of said rotary body, so that such wind pressure may be utilized to propel the aircraft in directions oblique to the direction of the wind pressure.

2. An aircraft as in claim 1; wherein a rudder extends in a vertical plane below the propeller.

3. In an aircraft, the combination with a substantially rigid fusiform shell; of levitating means; a series of rotary gyroscopic bodies having their axes substantially parallel with the longitudinal axis of said shell; means supporting the axes of said gyroscopic bodies, permitting respectively automatically free but limited altitudinal oscillatory movement thereof; a plurality of rotary propellers angularly adjustable and arranged to propel air in any desired direction relatively to the axis of said shell; and a rudder extending transversely to the axis of said shell beyond the radius of said propeller and angularly adjustable with respect to the axis of said shell; whereby, wind pressure tending to turn the aircraft from a predetermined direction of traverse, may be opposed by the gyroscopic effect of said rotary body, so that such wind pressure may be utilized to propel the aircraft in directions oblique to the direction of the wind pressure.

4. In an aircraft, the combination with levitating means; of a rotary gyroscopic body having its axis substantially parallel with the longitudinal axis of said craft; means supporting the axis of said gyroscopic body, permitting automatically free but limited altitudinal oscillatory movement thereof; a rotary propeller; and a rudder extending in a horizontal plane and angularly adjustable with respect to the axis of said craft; whereby, wind pressure tending to turn the aircraft from a predetermined direction of traverse, may be opposed by the gyroscopic effect of said rotary body, so that such wind pressure may be utilized to propel the aircraft in directions oblique to the direction of the wind pressure.

5. In an aircraft, the combination with levitating means; of a rotary gyroscopic body having its axis substantially parallel with the longitudinal axis of said craft; means supporting the axis of said gyroscopic body, permitting automatically free but limited altitudinal oscillatory movement thereof; a rotary propeller; and a plurality of rudders respectively extending in horizontal and vertical planes beyond the radius of said propeller and respectively angularly adjustable with respect to the axis of said craft; whereby, wind pressure tending to turn the aircraft from a predetermined direction of traverse, may be opposed by the gyroscopic effect of said rotary body, so that such wind pressure may be utilized to propel the aircraft in directions oblique to the direction of the wind pressure.

6. In an aircraft, the combination with a rotary propeller, arranged to propel said craft; of means, including a rudder, arranged to change the direction of progression of said craft; and a rotary gyroscopic body arranged to oppose changes in the direction of progression of said craft; said body having means suspending it from said craft, in stable equilibrium, but with its axis of rotation free for limited automatic movement altitudinally; whereby, wind pressure tending to turn the aircraft from a predetermined direction of traverse, may be opposed by the gyroscopic effect of said rotary body, so that such wind pressure may be utilized to propel the aircraft in directions oblique to the direction of the wind pressure.

7. In an aircraft, the combination with a substantially rigid fusiform shell; of levitating means; a rotary propeller arranged to propel said craft; means, including a rudder, arranged to change the direction of progression of said craft; and a rotary gyroscopic body arranged to oppose changes in the direction of progression of said craft; said body having means suspending it from said craft, in stable equilibrium, but with its axis of rotation free for limited automatic movement altitudinally; whereby, wind pressure tending to turn the aircraft from a predetermined direction of traverse, may be opposed by the gyroscopic effect of said rotary body, so that such wind pressure may be utilized to propel the aircraft in directions oblique to the direction of the wind pressure.

8. In an aircraft, the combination with a substantially rigid fusiform shell; of a plurality of rotary propellers carried by said shell upon respectively opposite sides thereof, and arranged to selectively propel said craft; a rudder, adjustable to change the direction of progression of said craft; and a plurality of rotary gyroscopic bodies, each independently suspended from said craft, in stable equilibrium, but with its axis of rotation free for automatic movement altitudinally, and having means arranged to selectively rotate them at different speeds and thereby oppose, to a variable degree, changes in the direction of progression of said craft; whereby, wind pressure tending to turn the aircraft from a predetermined direction of traverse, may be opposed by the gyroscopic effect of said rotary body, so that such wind pressure may be utilized to propel the aircraft in directions oblique to the direction of the wind pressure.

9. In an aircraft, the combination with a substantially rigid shell; of substantially static means arranged to levitate said shell; and means, including a rudder variable in its relation to the craft; a rotary gyroscopic body carried by said craft, in stable equilibrium but with its axis of rotation free for automatic movement altitudinally, and a rotary propeller carried by said craft, whereby four factors, to wit, first, wind pressure upon the craft, second, wind pressure upon said rudder, third, rotation of said gyroscopic body, and, fourth, rotation of said propeller may be coordinated to, selectively at the will of the operator, counteract, modify and supplement the effect of wind pressure upon said craft and affect the direction and rate of progression of said craft; whereby, wind pressure tending to turn the aircraft from a predetermined direction of traverse, may be opposed by the gyroscopic effect of said rotary body, so that such wind pressure may be utilized to propel the aircraft in directions oblique to the direction of the wind pressure.

In testimony whereof, I have hereunto signed my name at Philadelphia, Pennsylvania, this thirtieth day of January, 1929.

RUSSELL THAYER.